: "United States Patent Office  3,214,858  Patented Nov. 2, 1965"

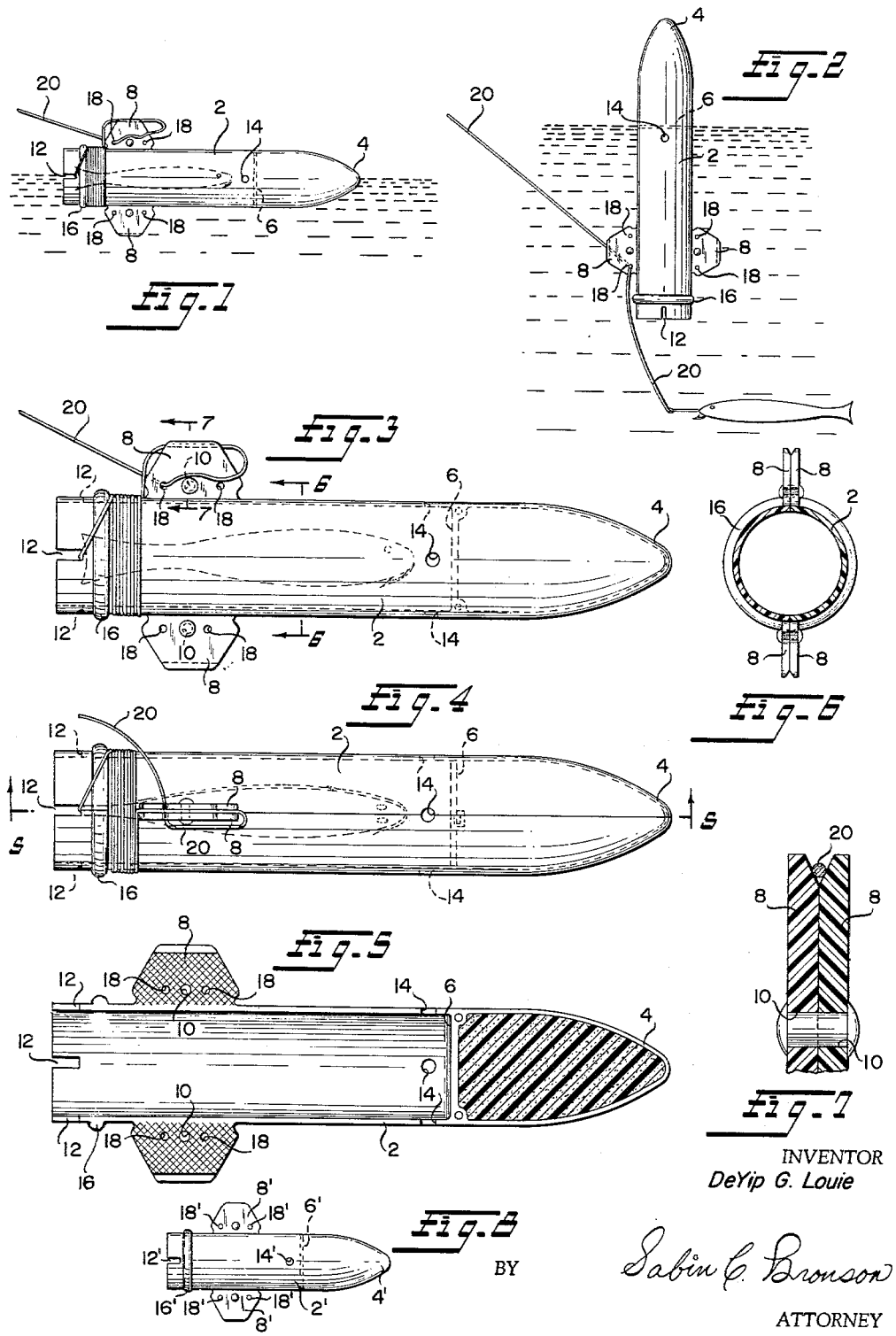

3,214,858
BAIT CASTING DEVICE
De Yip G. Louie, 222 Chestnut St., Monee, Ill.
Filed Feb. 10, 1964, Ser. No. 343,655
6 Claims. (Cl. 43—41.2)

This invention relates to a bait casting device and particularly to a hollow body, shaped like a rocket, within which live bait may be held captive while the device is cast, after which the bait will be freed from the device and be allowed to maneuver some distance from the device.

The device is constructed of plastic material, shaped like a rocket or missile, and of two identical halves which when together form a hollow body for enclosing a live bait. The body is provided with fins to give the device the appearance of a rocket.

The casting device has sufficient weight to be cast relatively great distances without injury to the bait when it hits the water and will the float with the open end down so that the bait will fall from the casting device and be able to maneuver around within the limits of the line from the bait to the caster.

An object of the invention is to provide a bait casting device constructed in two identical parts with fins to give the appearance of a rocket and also to frictionally hold the line from the casting device to the bait in a manner that it may be freed by a pull on the line.

The invention resides in the casting tube, closed at one end and open at the other to form a liquid container for the captive bait, with means adjacent the open end for attachment of a line, and means at the closed end providing buoyancy to hold said end up near or at the surface of the water, much like a bobber.

Other objects and advantages of the invention will appear in the following description thereof read in connection with the accompanying drawing illustrating a preferred embodiment of the invention and wherein like reference characters indicate like parts.

FIG. 1 is a side elevation of the preferred form of the invention.

FIG. 2 is a side elevation of the preferred form of the invention in operation.

FIG. 3 is an enlarged side elevation of FIG. 1.

FIG. 4 is a top plan view of FIG. 3.

FIG. 5 is a section taken on line 5—5 of FIG. 4 with the line and bait omitted for purposes of illustration.

FIG. 6 is a section taken along lines 6—6 of FIG. 3 with the line and bait being omitted for purposes of illustration.

FIG. 7 is a section taken along lines 7—7 of FIG. 3.

FIG. 8 is a side elevation of a modification of the invention.

In the drawing, 2 indicates an elongated hollow cylinder which is rocket shaped, being conical at its closed end as at 4. The cylinder is formed of two identical halves as indicated in FIGURES 5 and 6 which are made of light weight strong plastic such as polypropylene or equivalent material. So that the device may be readily seen by the fisherman as it bobs in the water, one-half will be, for example, of red colored material and the other white.

Each half is made in the form of a semi-cylinder with one-half of a transverse wall 6 formed in each half.

Near the tail of each half is formed a pair of lateral wings indicated at 8, each pair being diametrically opposite and on the plane of the longitudinal center of the device, so that when the halves are placed together, the sides of the wings will abut as in FIG. 6, and the edges of the wall will abut so as to divide the interior into two compartments and also to strengthen the body portion. When joined together as shown in FIGS. 4 and 6, the meeting edges of the two halves are coated with acetone or some plastic solvent so as to fuse the edges together into an integral unit. The nose compartment is filled with Styrofoam or other light material, or just left air tight, so that this end will function as a float and keep the unit upright in the water as shown in FIG. 2. The wings are riveted together through mating holes 10 so that the outer edges of the wings may be sprung apart and yieldingly hold the fish line therebetween during the casting operation. The open end of the housing portion is formed with short narrow slots indicated at 12 through which the line may be passed when the bait and sinker are placed within the hollow body preparatory to casting.

Openings 14 are placed 90° apart through the wall of the body portion just to the rear of the wall 6 to allow circulation of water through the housing when in the water.

To the rear of the wings an annular circumferential collar 16 is formed on the housing to provide a stop or guide in winding the line about the hollow body, and to further strengthen the device. In the wings on opposite sides of the mating holes 10 are formed smaller mating holes 18 for threading the fish line therethrough. The fish line is passed through one of the holes 18 around the wings and pressed down between the wings as shown in FIG. 3, then wound around the device several turns, depending on how deep the fisherman wants to fish, then passed through one of the slots 12 and to the minnow or other bait which is placed within the device. A weight or sinker is also on the line near the hook at the end of the line and to which the bait is fastened.

When the device is cast, it will hit the water without damaging the live bait therein, and the device will then assume an upright position as shown in FIG. 2. The minnow will then drop out of the container and be able to maneuver about within the limit of the line which was wound around the device.

If a fish strikes the minnow and is hooked, the pull of the fish on the line and the resistance of the fisherman to that pull will free the line from its frictional engagement between the halves of the wings and the line will slide through the hole 18 until the hooked fish is near the device. The fish will then be easier to land.

It will be noted that the rear edges of the wings incline toward the wall of the device, which inclined edges form a guide to the line as it is wound by the fisherman about the tubular body between the wings 8 and the collar 16, preparatory to casting.

The device is made in different sizes for different types of fishing. A smaller size is shown in FIG. 8, and the comparable parts are given the same reference numerals with a prime mark thereafter. The only difference is that of size; structurally they are identical.

The principal feature of the bait caster is in the wings for yieldingly holding the line, and in winding that part of the line which controls the depth of fishing about the caster during the casting operation, and when a fish strikes the bait and is hooked, allowing the line to slide in the opening 18 until the hooked fish is near the casting device.

I claim:
1. A live-bait casting device comprising an elongated hollow body open at one end and adapted to receive a live bait, pairs of wings extending laterally from said body adjacent its open end, each of said pairs of wings extending from opposite sides of said body, a fish line frictionally and releasably held between a pair of said wings and having a hook at the end thereof to which the live bait is applied, said bait and end of line being carried within said hollow body during the casting operation and releasable therefrom when the casting device is in the water, one end of said hollow body being closed to form a buoyant end to maintain the device upright when in the water.

2. The combination set forth in claim 1, said wings having openings therein, said fish line passing through said openings, between said wings, about said body, and to said bait within the hollow body, said line being releasable from said wings by a pull on said line by a fish striking said bait.

3. The combination set forth in claim 1, said hollow body having a transverse dividing wall adjacent said closed end separating said device into two compartments, and buoyant material in the closed end compartment so that when in the water the closed end will float and act as a bobber.

4. A live-bait casting device comprising two elongated hollow identical halves, each closed at one end, each having lateral wings extending therefrom, said halves being fused together to form an integral hollow rocket-shaped casting device, an annular collar spaced from said wings, buoyant means in the closed end of said device, said wings being yieldingly resilient so as to frictionally but releasably hold a line therebetween, one end of said line having a live bait attached thereto and said end of said line being wound around said hollow body adjacent said wings and collar and extending into said body to said bait during the casting operation and freed from said hollow body when cast.

5. The combination set forth in claim 4, and longitudinal slots in the open end of said device, said line passing within a slot to the bait in the interior of said device to prevent unwinding of said line until the device releases a body of bait in the water.

6. The combination set forth in claim 4, the rear edges of said wings being inclined to facilitate winding of said line about said device between said collar and said wings.

References Cited by the Examiner

UNITED STATES PATENTS

| | | | |
|---|---|---|---|
| 1,707,820 | 4/29 | Stackelberg | 43—43.11 |
| 2,487,344 | 11/49 | Lambert | 43—41 |
| 2,592,441 | 4/52 | Louthan | 43—43.11 |
| 2,910,798 | 11/59 | Bias | 43—41.2 |

FOREIGN PATENTS 611,631  1/61  Canada.

ABRAHAM G. STONE, *Primary Examiner.*